(12) United States Patent (10) Patent No.: US 11,940,579 B2
Huang et al. (45) Date of Patent: Mar. 26, 2024

(54) METHOD AND SYSTEM USING WAVE-EQUATION FOR OBTAINING TRAVELTIME AND AMPLITUDE USED IN KIRCHHOFF MIGRATION

(71) Applicant: CGG SERVICES SAS, Massy (FR)

(72) Inventors: Hui Huang, Katy, TX (US); Diancheng Wang, Houston, TX (US); Ping Wang, Sugarland, TX (US)

(73) Assignee: CGG SERVICES SAS, Massy (FR)

( * ) Notice: Subject to any disclaimer, the term of this patent is extended or adjusted under 35 U.S.C. 154(b) by 193 days.

(21) Appl. No.: 17/453,994

(22) Filed: Nov. 8, 2021

(65) Prior Publication Data

US 2022/0308245 A1 Sep. 29, 2022

Related U.S. Application Data

(60) Provisional application No. 63/165,774, filed on Mar. 25, 2021.

(51) Int. Cl.
*G01V 1/28* (2006.01)
*G01V 1/30* (2006.01)
*G01V 1/34* (2006.01)

(52) U.S. Cl.
CPC .............. *G01V 1/282* (2013.01); *G01V 1/301* (2013.01); *G01V 1/305* (2013.01); *G01V 1/307* (2013.01); *G01V 1/345* (2013.01)

(58) Field of Classification Search
CPC ........ G01V 1/282; G01V 1/301; G01V 1/305; G01V 1/307; G01V 1/345
See application file for complete search history.

(56) References Cited

U.S. PATENT DOCUMENTS 10,670,751 B2 * 6/2020 Qin .................. G01V 1/282
10,816,685 B2 * 10/2020 Wang ............... G01V 1/005
11,487,033 B2 * 11/2022 Pereira ............. G01V 1/003

OTHER PUBLICATIONS

Office Action in related/corresponding GB Application No. 2201598.6 dated Jul. 15, 2022.
Yu Pu et al., "Wave-equation traveltime and amplitude for Kirchhoff migration," First International Meeting for Applied Geoscience & Energy, 2021, Society of Exploration Geophysicists, pp. 2684-2688.
Albert Tarantola, "Inversion of seismic reflection data in the acoustic approximation," Geophysics, Aug. 1984, pp. 1259-1266, vol. 49, No. 8.
Andreas Ehinger et al., "Green's function implementation of common-offset wave—equation migration," Geophysics, 1996, pp. 1813-1821, vol. 61, No. 6.

(Continued)

*Primary Examiner* — Elias Desta
(74) *Attorney, Agent, or Firm* — PATENT PORTFOLIO BUILDERS PLLC (57) ABSTRACT

Limitations in accuracy and computing power requirements impeding conventional Kirchhoff migration and reverse time migration are overcome by using the wave-equation Kirchhoff, WEK, technique with Kirchhoff migration. WEK technique includes forward-propagating a low-frequency wavefield from a shot location among pre-defined source locations, calculating an arrival traveltime of a maximum amplitude of the low-frequency wavefield, and applying Kirchhoff migration using the arrival traveltime and the maximum amplitude.

20 Claims, 12 Drawing Sheets

(56) References Cited

OTHER PUBLICATIONS

Bao D. Nguyen et al., "Excitation amplitude imaging condition for prestack reverse-time migration," Geophysics, 2013, pp. S37-S46, vol. 78, No. 1.

Dave E. Nichols, "Maximum energy traveltimes calculated in the seismic frequency band," Geophysics, 1996, pp. 253-263, vol. 61, No. 1.

Houzhu Zhang et al., "Reverse time migration in 3D heterogeneous TTI media," published in 78th Annual International Meeting, SEG, Extended Abstracts, 2018, pp. 2196-2200.

Hu Jin et al., "Evaluating Kirchhoff migration using wave-equation generated maximum amplitude traveltimes," published in 90th Annual International Meeting, SEG, Expanded Abstracts, 2020, pp. 2968-2972.

John T. Etgen, "3D wave equation Kirchhoff migration," published in 82nd Annual International Meeting, SEG, Expanded Abstracts, 2012, pp. 1-5.

Patrick Lailly, "The seismic inverse problem as a sequence of before stack migrations," published in Conference on inverse scattering: Theory and application SIAM (Society for Industrial and Applied Mathematics), 1983, pp. 206-220.

Peng Shen et al., "Up-down separation using Hilbert Transformed source for causal imaging condition," published in 85th SEG Annual International Meeting, Expanded Abstracts, 2015, pp. 4175-4179.

Ping Wang et al., "Full-waveform inversion for salt: A coming of age," published in The Leading Edge, Mar. 2019, pp. 204-213, vol. 38, No. 3.

Protásio N. Andrade et al., "Kirchhoff depth migration using maximum amplitude traveltimes computed by the Chebyshev polynomial recursion," published in 14th International Congress of the Brazilian Geophysical Society and EXPOGEF, 2015, pp. 1109-1113.

Samuel H. Gray et al., "Kirchhoff migration using eikonal equation traveltimes," published in Geophysics, May 1994, bp. 810-817, vol. 59, No. 5.

Sergey Fomel, "Traveltime computation with the linearized eikonal equation," Sep. 1994, pp. 337-346.

Xukai Shen et al., "High resolution full waveform inversion for structural imaging in exploration," published in 88th Annual International Meeting, SEG, Expanded Abstracts, 2018, pp. 1098-1102.

Zhigang Zhang et al., "Correcting for salt misinterpretation with full-waveform inversion" published in 88th Annual International Meeting, SEG, Expanded Abstracts, 2018, pp. 1143-1147.

Zhigang Zhang et al., "FWI Imaging: Full wavefield imaging through full-waveform inversion," published in 90th Annual International Meeting, SEG, Expanded Abstracts, 2020, pp. 656-660.

Zhiping Yang et al., "Improved subsalt tomography using RTM surface offset gathers," published in 85th Annual International Meeting, SEG, ExpandedAbstracts, 2015, pp. 5254-5258.

\* cited by examiner

Depth

Horizontal Coordinate

FIGURE 14

Depth

Horizontal Coordinate

FIGURE 15

Depth

Horizontal Coordinate

FIGURE 16

Depth

Horizontal Coordinate

FIGURE 17

Depth

Horizontal Coordinate

FIGURE 18

Depth

Horizontal Coordinate

METHOD AND SYSTEM USING WAVE-EQUATION FOR OBTAINING TRAVELTIME AND AMPLITUDE USED IN KIRCHHOFF MIGRATION

TECHNICAL FIELD

Embodiments of the subject matter disclosed herein generally relate to seismic data processing methods and systems that employ Kirchhoff migration to obtain accurate images of explored underground formations.

DISCUSSION OF THE BACKGROUND

Seismic surveys save companies from the significant expenses of drilling unsuccessful wells on dry land, expenses that are only magnified when the unprofitable well is drilled under several thousand feet of water. Underground formation images generated by processing data acquired during seismic surveys provide information about the underground formation's features, and even precisely whether and where subsurface resources (e.g., hydrocarbons, mineral deposits, geothermal resources, etc.) are present therein.

Figure 1:
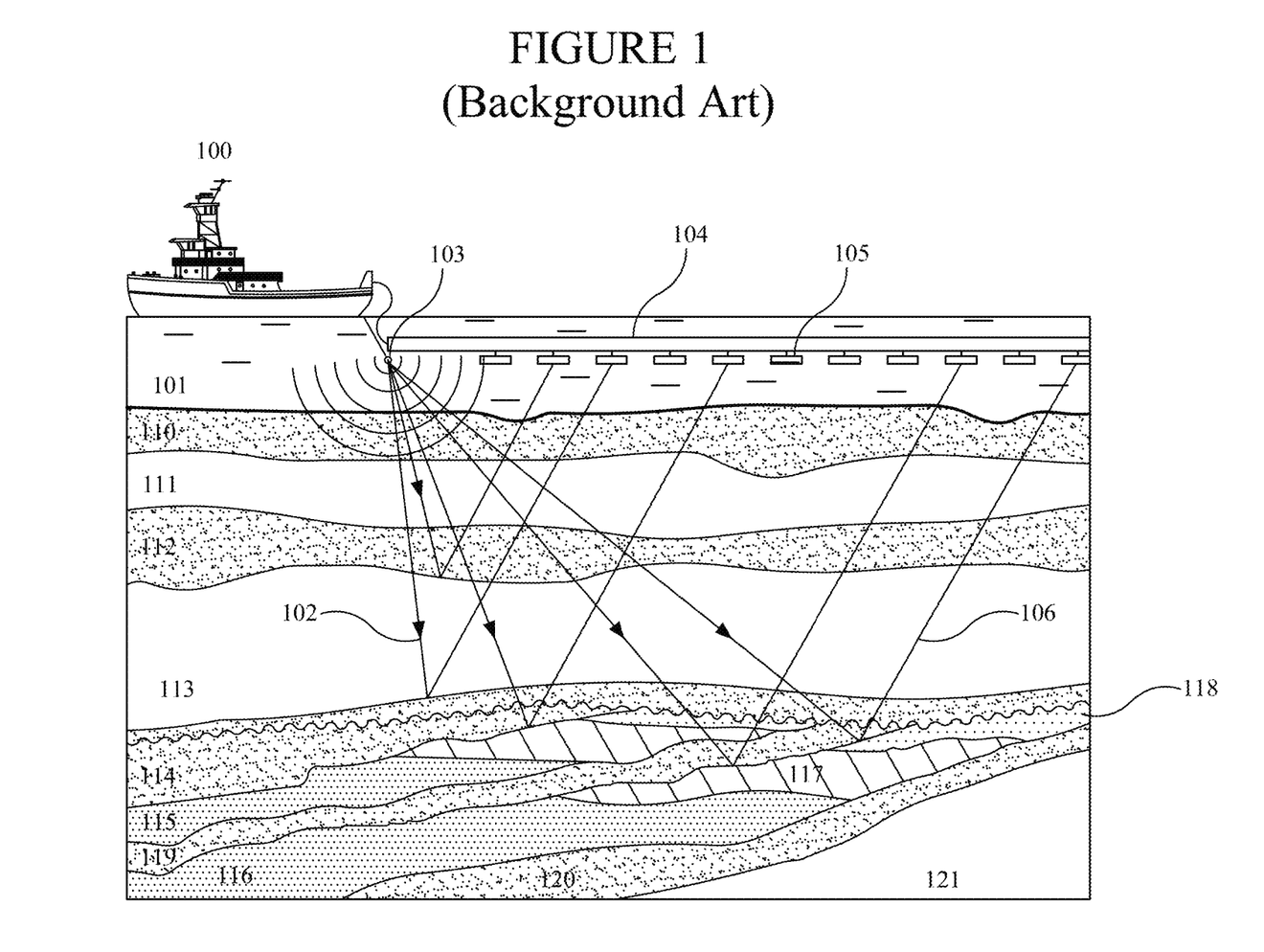
FIG. 1 illustrates marine seismic data acquisition.

FIG. 1 illustrates a marine seismic survey during which seismic waves probe the structure of formations under the seafloor 101. Seismic waves 102 are generated by a source 103 (e.g., one or more air guns) towed under the water surface by a vessel 100. Vessel 100 also tows a streamer 104 housing sensors 105 that detect the seismic waves 106 after bouncing off interfaces between different layers of the subsurface formations beneath the seafloor. The layers in the subsurface formation may be impermeable rock (e.g., 110, 112, 114,119, 120), sedimentary rock (e.g., 111, 113, 121), etc. Besides the rock layers, there may be oil (e.g., 117), gas (e.g., 118) and water (e.g., 115 and 116). Fluids (e.g., oil, gas and water) may also fill the pores of rocks or seep into cracks thereof. The sensors record amplitude versus time series following seismic wave emissions to generate seismic data that carries structural information about the explored underground formations. Seismic data undergoes complex processing to obtain an image of the underground formations; that is, a three-dimensional (3D) description of the volumes therein (e.g., boundaries' shape and location, mechanical and electrical properties, and, in particular, seismic wave propagation velocities).

One technique to achieve a realistic 3D description of the underground formation from the seismic data is full-waveform inversion (FWI). In FWI, simulated data emulating the acquired seismic data is generated using a 3D structural model of the explored underground formation. The model is usually a velocity model characterizing seismic wave propagation velocity throughout the underground formation (in each layer and each direction for P- or S-seismic waves). It may also include a reflectivity model characterizing the location of layer interfaces and seismic wave behavior when encountering the interfaces in their paths.

In FWI, the simulated data is compared with the acquired data via a cost function, which is then minimized by changing the model parameters (e.g., velocity values, position of the interfaces, etc.). A model updated in this manner provides a more accurate image of the underground formation than the initial model. This process (generating simulated data, calculating cost function, changing the model parameters to minimize the cost function) is usually iterated a predetermined number of times or until a convergence criterion is met.

Full-waveform inversion (FWI) was first proposed in the 1983 article "The seismic inverse problem as a sequence of before stack migrations" by P. Lailly (published in Conference on inverse scattering: Theory and application SIAM—Society for Industrial and Applied Mathematics—pp. 206-220) and the 1984 article "Inversion of seismic reflection data in the acoustic approximation" by A. Tarantola (published in *Geophysics,* 49(8), pp. 1259-1266). With recent advancements in the FWI algorithm and computing power, FWI has become usable for almost all types of seismic datasets (land, marine towed-streamer, ocean bottom nodes, etc.) to automatically (i.e., without human intervention) build high-resolution velocity models as described, for example, in the 2018 article "High resolution full waveform inversion for structural imaging in exploration" by Shen et al. (published in 88$^{th}$ Annual International Meeting, SEG, Expanded Abstracts, pp. 1098-1102); the 2018 article "Correcting for salt misinterpretation with full-waveform inversion" by Zhang et al. (published in 88$^{th}$ Annual International Meeting, SEG, Expanded Abstracts, pp. 1143-1147); the 2020 article "FWI Imaging: Full-wavefield imaging through full-waveform inversion" by Zhang et al. (published in 90$^{th}$ Annual International Meeting, SEG, Expanded Abstracts, pp. 656-660); and the 2019 article "Full-waveform inversion for salt: A coming of age" by Wang et al. (published in *The Leading Edge,* 38(3), pp. 204-213). In order to take full advantage of FWI velocity models, the migration algorithm must account for fine-scale geo-bodies and sharp contrasts while also affordably producing high-frequency migration stacks and gathers.

Ray-based Kirchhoff migration is an efficient method to generate high-frequency stacks and gathers. Therefore, it is widely used in almost all stages of seismic imaging including preprocessing (e.g., as a quality control tool), velocity model building, and final migration. However, ray-based Kirchhoff migration relies on raytracing to calculate traveltimes and the corresponding amplitudes. Raytracing requires a smoothly varying velocity model and becomes inaccurate and unstable when a velocity model has large variations, sharp contrasts or complex geological structures.

Another technique, Reverse Time Migration (RTM) employs full-wavefield propagation based on the wave equation and, thus, can accurately handle high-resolution, complex models (as discussed in the 2008 article "Reverse time migration in 3D heterogeneous TTI media" by Zhang, H. and Zhang, Y., published in 78$^{th}$ Annual International Meeting, SEG, Extended Abstracts, pp. 2196-2200). However, the cost of RTM becomes prohibitive when high-frequency stacks and gathers are needed. Generating high-frequency surface offset gathers with RTM is even more prohibitive, as discussed in the 2015 article "Improved subsalt tomography using RTM surface offset gathers" by Yang et al. (published in 85$^{th}$ Annual International Meeting, SEG, Expanded Abstracts, pp. 258).

For Kirchhoff migration to utilize high-resolution, complex velocity models, several authors propose strategies to replace ray-based traveltime calculations with wave-equation-based methods. For example, the 1996 article "Maximum energy traveltimes calculated in the seismic frequency band" by Nichols, D. E. (published in *Geophysics,* 61(1), pp. 253-263) describes a maximum energy traveltime calculation starting from the Helmholtz equations at a few frequencies within the seismic frequency band. In other examples, the 1996 article "Green's function implementation of common-offset wave—equation migration" by Ehinger, A. et al. (*Geophysics,* 61(6), pp. 1813-1821) and the 2012 article "3D wave equation Kirchhoff migration" by Etgen, J. T. (published in 82$^{nd}$ Annual International Meeting, SEG, Expanded Abstracts, pp. 1-5) describe Kirchhoff migration using Green's function computed with wavefield extrapolation techniques based on a finite-difference implementation of the wave equation. Furthermore, the 2015 article "Kirchhoff depth migration using maximum amplitude traveltimes computed by the Chebyshev polynomial recursion" by Andrade et al. (published in 14$^{th}$ International Congress of the Brazilian Geophysical Society and EXPOGEF, pp. 1109-1113) describes a method for calculating maximum amplitude traveltimes using the Chebyshev polynomial recursion. Taking advantage of advanced computer capabilities, a method described in the 2020 article "Evaluating Kirchhoff migration using wave-equation generated maximum amplitude traveltimes" by Jin, H. and Etgen, J. (published in 90$^{th}$ Annual International Meeting, SEG, Expanded Abstracts, pp. 2968-2972) directly generates maximum-amplitude traveltimes using finite-difference solutions to the full wave equation. This solution is limited within a low-frequency band to reduce cost, but still achieves considerable improvement in stack coherence and gather flatness.

The above-described Kirchhoff migration techniques either use one-way wave equation to extract down-going wavefield (approach which is not accurate for high-dipping interfaces) or ignore the wavefields' amplitude in Kirchhoff migration (the wavefields' amplitude providing information of subsurface illumination). There is a need to continue developing Kirchhoff migration techniques to correctly deal with large velocity contrasts and overcome the above-identified weaknesses or inaccuracies of the conventional Kirchhoff migration techniques. All the articles cited in this section are incorporated by references in their entirety.

SUMMARY

Methods and apparatuses according to various embodiments use a full wave equation to simulate low frequency (10-20 Hz) wave propagation and derive both traveltimes and amplitudes to be used in the Kirchhoff migration from the maximum-amplitude arrival of the low-frequency waves using the wave equation.

According to an embodiment, there is a seismic exploration method that includes obtaining seismic data acquired over a subsurface formation, migrating the seismic data based on a model of the subsurface formation and using a wave-equation Kirchhoff, WEK, technique for pre-defined source locations, and outputting an image of the subsurface formation representing the migrated seismic data. The WEK technique includes forward-propagating a low-frequency wavefield from a shot location among the predefined source locations, deriving an arrival traveltime of a maximum amplitude of the low-frequency wavefield, and applying Kirchhoff migration using the arrival traveltime and the maximum amplitude.

According to another embodiment, there is a seismic data processing apparatus for exploring an underground formation. The apparatus has an interface configured to obtain seismic data acquired over a subsurface formation and a data processing unit connected to the interface. The data processing unit is configured to migrate the seismic data based on a model of the subsurface formation and using a WEK technique for pre-defined source locations, and to output an image of the subsurface formation representing the migrated seismic data. The WEK technique includes forward-propagating a low-frequency wavefield from a shot location among the pre-defined source locations, deriving an arrival traveltime of a maximum amplitude of the low-frequency wavefield, and applying Kirchhoff migration using the arrival traveltime and the maximum amplitude.

According to yet another embodiment, there is a non-transitory computer readable recording medium storing executable codes that when executed by a computer make the computer perform a seismic exploration method. The method includes obtaining seismic data acquired over a subsurface formation, migrating the seismic data based on a model of the subsurface formation and using a WEK technique for pre-defined source locations, and outputting an image of the subsurface formation representing the migrated seismic data. Here again, the WEK technique includes forward-propagating a low-frequency wavefield from a shot location among the pre-defined source locations, deriving an arrival traveltime of a maximum amplitude of the low-frequency wavefield, and applying Kirchhoff migration using the arrival traveltime and the maximum amplitude.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places is not necessarily referring to the same embodiment. Further, the particular features, structures or characteristics may be combined in any suitable manner in one or more embodiments.

In some of the following embodiments, the wave-equation Kirchhoff, WEK, approach simulates full-wavefield (i.e., two-way wave-equation) propagation at low frequencies (e.g., 10-20 Hz), and then derives both the traveltimes and amplitudes to be used in Kirchhoff migration from the maximum-amplitude arrival. The frequency range of the seismic data may extend up to 100 Hz.

Consider the Kirchhoff migration's general formulation set forth in the book entitled *Mathematics of multidimensional seismic imaging, migration and inversion* by Bleistein et al. (published by Springer ISBN 978-1-4612-6514-6). According to this formulation (i.e., equation 5.1.47 with $\phi = \tau_s + \tau_r$; $a = A(x, x_s)A(x_r, x)$; and the 2D integral on surface $d\xi^2 = d\xi_1\, d\xi_2 = d\xi$), reflectivity R:

$$R(x) \sim \frac{1}{8\pi^3} \int w(x, \xi) e^{i\omega(\tau_s + \tau_r)} u_s(x_r, x_s, \omega) i\omega d\omega d\xi \quad (1)$$

where the weighting function $w(x,\xi)$ is written as $$w(x, \xi) = \frac{|h(x, \xi)|}{A(x, x_s)A(x_r, x)|\nabla(\tau_s + \tau_r)|^2} \quad (2)$$

with the Beylkin determinant $$h(x, \xi) = \begin{vmatrix} \nabla(\tau_s + \tau_r) \\ \frac{\partial}{\partial \xi_1} \nabla(\tau_s + \tau_r) \\ \frac{\partial}{\partial \xi_2} \nabla(\tau_s + \tau_r) \end{vmatrix} \quad (3)$$

$x_s(\xi), x_r(\xi)$ and $x$ are source, receiver and image points, respectively; $\xi = (\xi_1, \xi_2)$ parametrizes the acquisition surface (where the source(s) and receivers are located); $u_s(x_r, x_s, \omega)$ is the detected wavefield with $\omega$ representing frequency; $\tau_s$ and $\tau_r$ are the traveltimes from the shot location (i.e., source emitting the seismic waves) to the image point, and the image point to the receiver location, respectively; $A(x, x_s)$ and $A(x_r, x)$ are amplitude of Green functions corresponding to the indicated points. In conventional ray-based Kirchhoff migration, the traveltimes $\tau_s$ and $\tau_r$ can be found by solving the eikonal equation (4) below formulated, for example, by Aki, K. and Richards, P. G. in their 1980 book *Quantitative seismology: Theory and methods* (ISBN-10: 1891389637) and the 1994 article "Kirchhoff migration using eikonal equation traveltimes" by Gray and May (published in *Geophysics*, 59(5), pp. 810-817):

$$\nabla\tau \cdot \nabla\tau - \frac{1}{c^2} = 0 \quad (4)$$

where c is the medium velocity. The amplitude of the Green function A(x,y) between x and y can be calculated by solving the transport equation:

$$\nabla^2 \tau + \frac{2}{A} \nabla A \cdot \nabla \tau = 0. \quad (5)$$

The eikonal equation and the transport equation adopt the high-frequency asymptotic assumption (AA) of the full wave-equation (AA is set forth, for example, in the above-cited book by Bleistein et al., Appendix E, equations (E.1.1-2) and following two equations therein). Therefore, these equations are valid only when the medium velocity varies slowly. In order to overcome this limitation and enable equation (1) to handle fine-scale geo-bodies and strong velocity contrasts (e.g., velocity models from high-frequency FWI, carbonate layers, and salt boundaries), the eikonal and the transport equations are replaced by equations derived from the wavefield u computed by full-wavefield propagation:

$$\left(\frac{1}{c^2}\frac{\partial}{\partial t^2} - \nabla^2\right)u(x, x_s, t) = \delta(x, x_s)f(t). \quad (6)$$

where c is the medium velocity, $u(x,x_s,t)$ is the full-wavefield at subsurface location $x=(x,y,z)$, $\delta(x,x_s)$ describes a point source located at source location $x_s$, and f(t) is the source wavelet and usually it is a Ricker wavelet. This approach, called wave-equation Kirchhoff (WEK), consists of three main steps: (A) placing a point source at a shot location and forward-propagating the wavefield to subsurface point (image point) according to the velocity model; (B) deriving a traveltime and an amplitude of the maximum-amplitude arrival at each subsurface location; and (C) using the derived traveltime and amplitude when applying Kirchhoff migration according to equation (1).

In one embodiment, at step (A), a full-wavefield propagation based on the wave equation (6) is performed at relatively low frequency (i.e., 10~20 Hz). Then, a full-wavefield propagation based on wave equation is performed at same relatively low frequency (i.e., 10~20 Hz) with a Hilbert transformed source wavelet for the same surface location:

$$\left(\frac{1}{c^2}\frac{\partial}{\partial t^2} - \nabla^2\right)u_h(x, x_s, t) = \delta(x, x_s)H_t(f(t)), \quad (7)$$

where $H_t(f(t))$ is the Hilbert transformed source wavelet and $u_h(x,x_s,t)$ is the corresponding wavefield.

The down-going wavefield is obtained from the outputs of the calculations using Formula (6) and (7) by applying a 1D Fourier filter in depth domain, as described in the 2015 article "Up-down separation using Hilbert Transformed source for causal imaging condition" by Shen and Albertin (published in 85$^{th}$ SEG Annual International Meeting, Expanded Abstracts, pp. 4175-4179):

$$u_d(x, y, z, x_s, t) = \frac{1}{2\pi^2} Re \int_{-\infty}^{0} \int_{-\infty}^{+\infty} (u(x, y, z', x_s, t) + iu_h(x, y, z', x_s, t)) e^{ik_z(z-z')} dz' dk_z, \quad (8)$$

where $u_d(x,x_s,t)=u_d(x,y,z,x_s,t)$ stands for the down-going wavefield, and $\int_{-\infty}^{0} *dk_z$ is the 1D Fourier filter in depth domain used to extract the down-going wavefield.

The down-going wavefields are recorded and used to pick the traveltimes and amplitudes of the maximum-amplitude arrival for all subsurface locations. The process is repeated for all pre-defined surface source locations, usually regular surface grid, before performing a Kirchhoff migration using the picked traveltimes r and amplitudes A.

Figure 2:
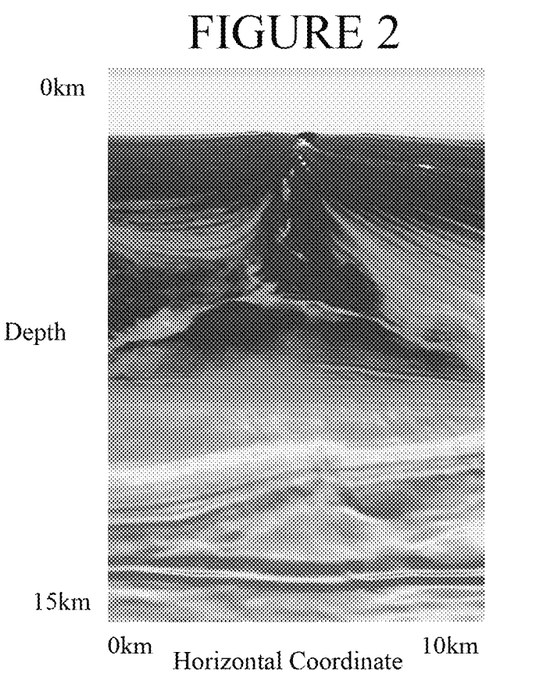
FIG. 2 is a model velocity slice.
Figure 3:
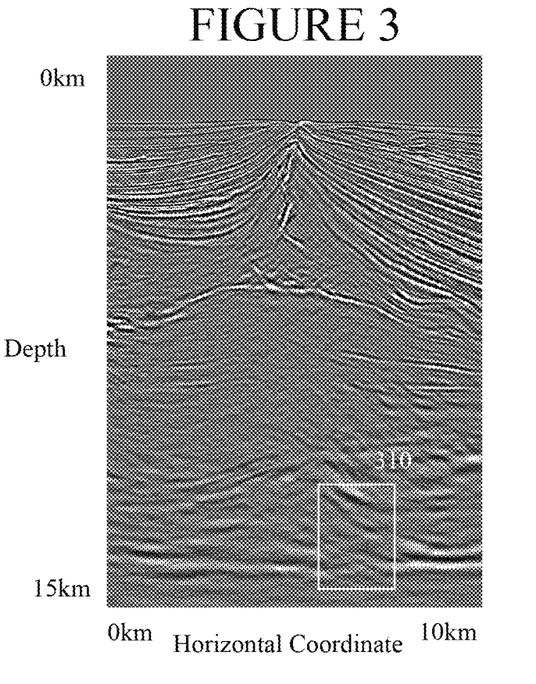
FIG. 3 illustrates the result of conventional ray-based Kirchhoff migration using the model in FIG. 2.

To better emphasize the benefits of WEK, the raytracing results are showed for comparison with the WEK results. FIG. 2 illustrates a velocity model of 15 km depth and 10 km horizontally from a 15 Hz FWI output, with velocity in the range of 1450 m/s to 5500 m/s illustrated as nuances of gray. FIG. 3 shows the result of conventional ray-based Kirchhoff migration using the velocity model in FIG. 2. This approach cannot handle the large variations or strong contrasts (as pointed out in area 310) because traveltime and amplitude are based on raytracing.

Figure 4:
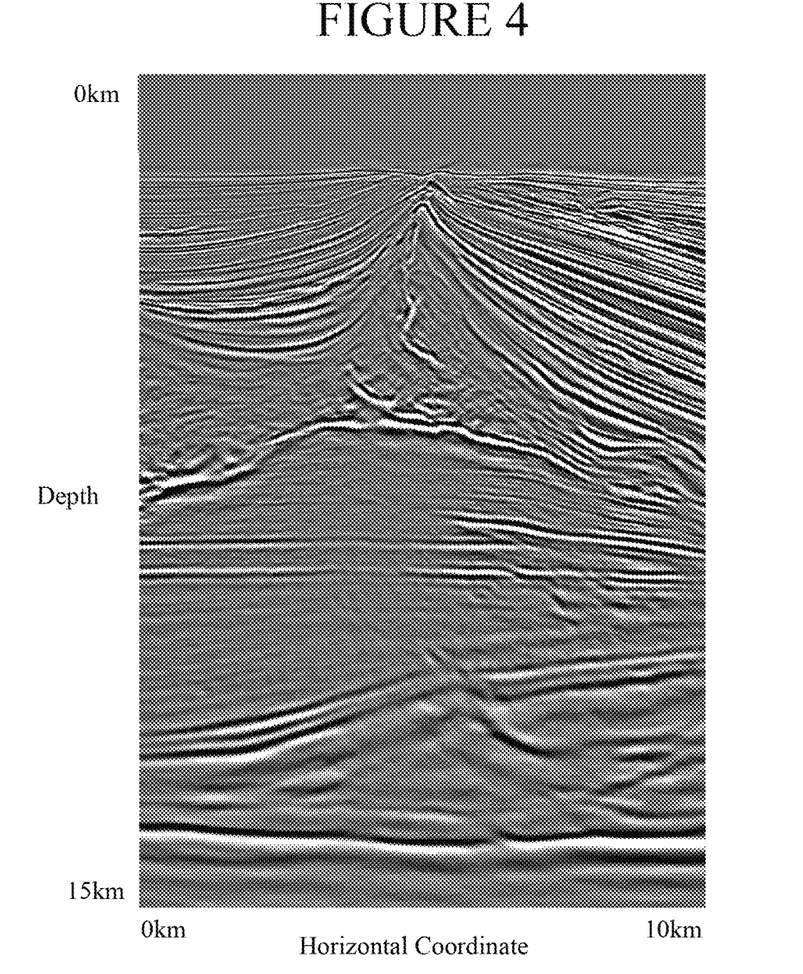
FIG. 4 illustrates the result of reverse time migration using the model in FIG. 2.

FIG. 4 shows the result of RTM using the velocity model in FIG. 2. RTM uses full-wave propagation and accurately reproduces the details in the velocity model, but it is computationally expensive, particularly if calculating the higher frequency stacks and gathers is required.

Figure 5:
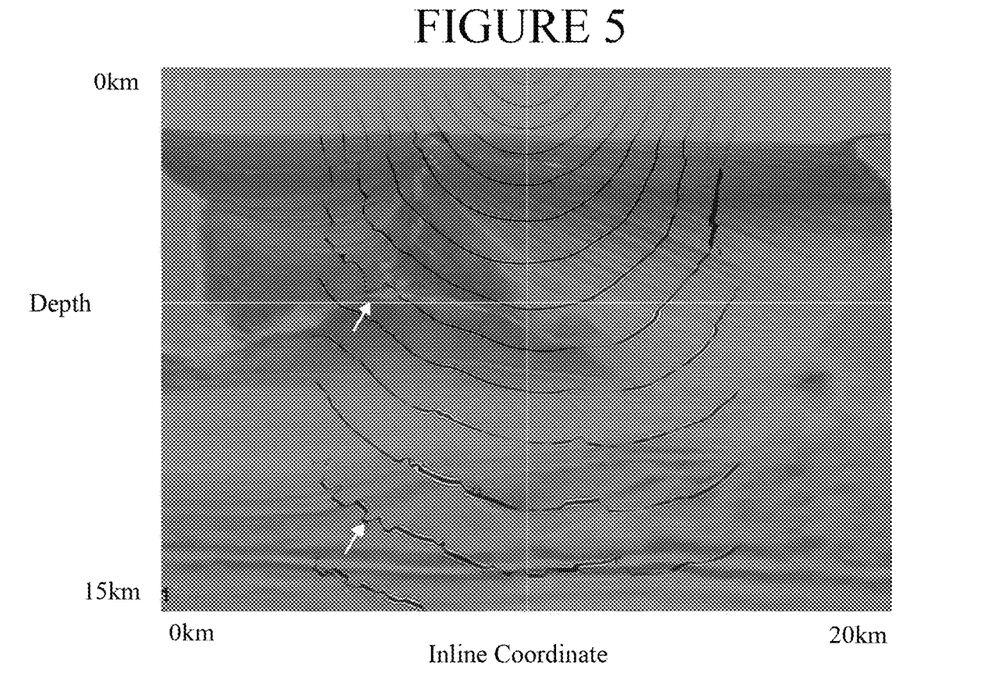
FIG. 5 illustrates the impulse response obtained using conventional ray-based Kirchhoff migration.
Figure 6:
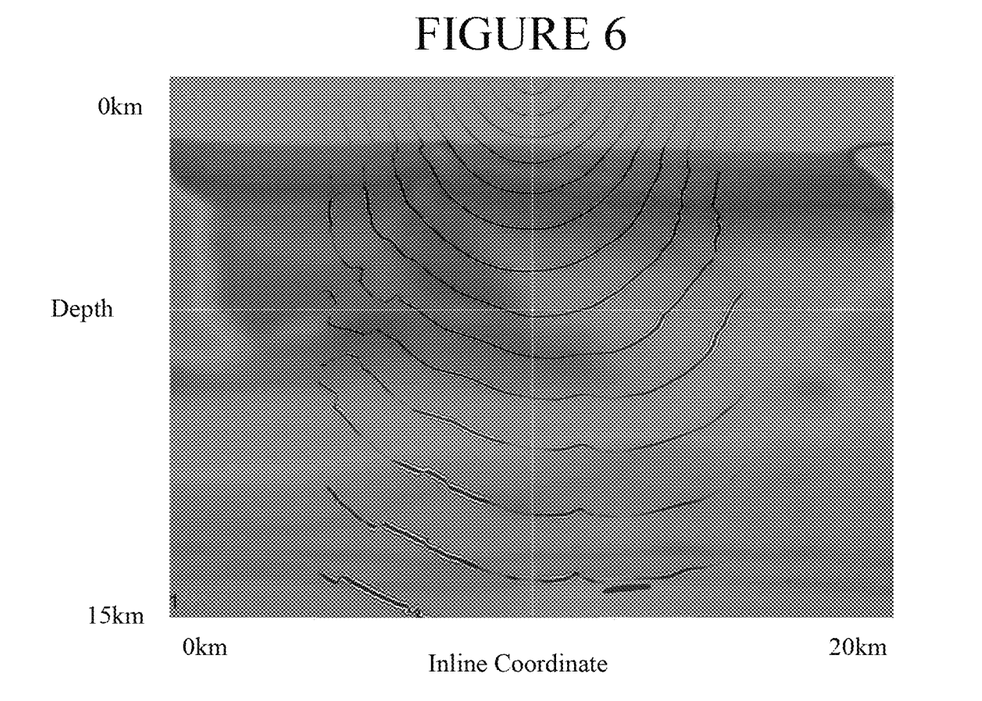
FIG. 6 illustrates the impulse response obtained using conventional ray-based Kirchhoff migration with a smoothly varying velocity model.

Returning to raytracing, the calculated wavefronts may also be unstable and inaccurate. For example, consider the impulse response (e.g., the zero-offset migration of a series of spikes at every 400 ms) from conventional ray-based Kirchhoff migration that yields 3D iso-surfaces of constant traveltime in the 3D space after migration. As illustrated in FIG. 5 (which is an inline slice, but crossline slices and a horizontal plane would show similar effects), for the velocity model in FIG. 2, raytracing yields discontinuities (indicated by arrows) in the impulse response, showing instability. A smoothly varying velocity model that stabilizes raytracing then yields traveltimes and amplitudes as illustrated in FIG. 6, where the shapes of wavefronts differ from that of the impulse response using the original unsmoothed model, indicating error.

Figure 7:
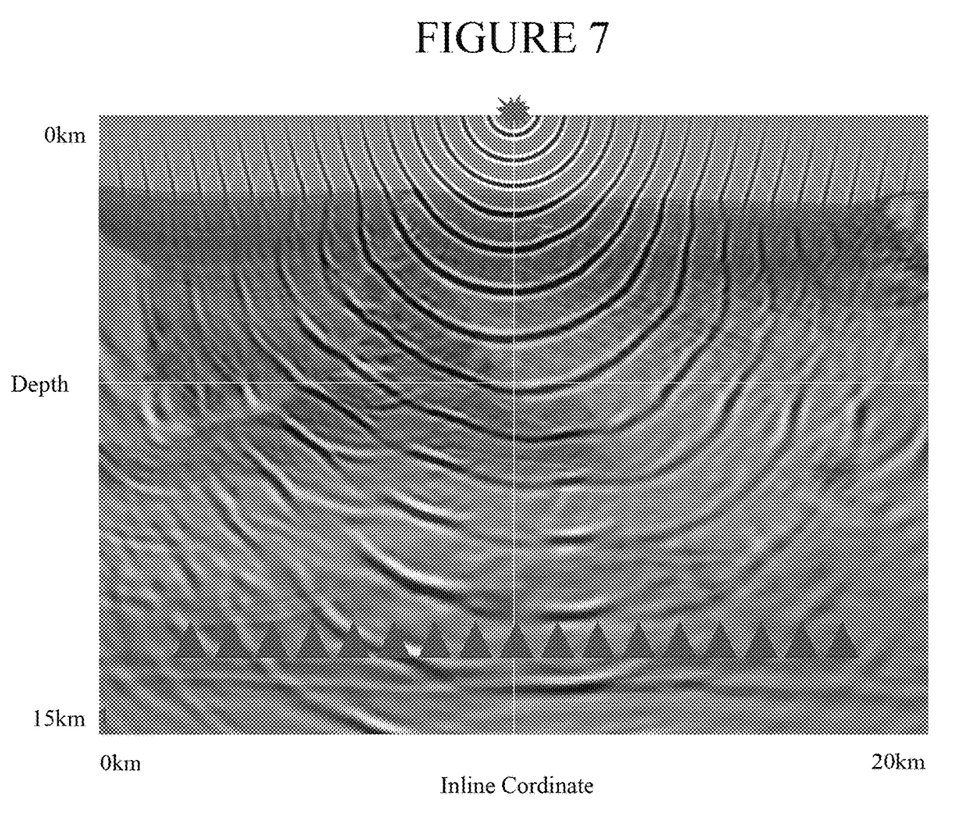
FIG. 7 illustrates wave propagation used by WEK technique according to an embodiment.

Considering now WEK approach, the first step (A above) illustrated in FIG. 7 is the downgoing wavefield using the up-down wavefield separation equation (8) from the point source marked as a star at the top of the inline slice to various image points marked as upward-pointing aligned triangles at the bottom. For marine towed-streamer surveys, these source locations are distributed near the water surface in a regular grid. For OBN surveys, the source locations are located near the water surface (to represent shot locations in a real acquisition) and at the water bottom surface (to represent receiver/node locations in a real acquisition). In wave propagation, up-down field separation is applied to keep only the down-going wave.

Figure 8:
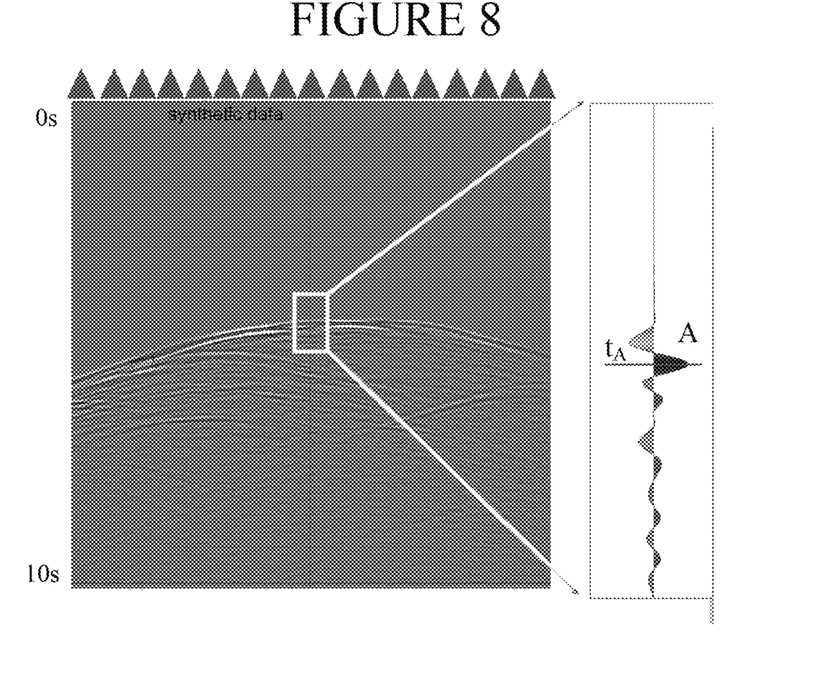
FIG. 8 illustrates picking a traveltime-amplitude pair in WEK technique according to an embodiment.

Then, in step B, for each subsurface location, a traveltime-amplitude pair corresponding to maximum amplitude is picked for a subsurface location, as illustrated in FIG. 8. Multiple arriving signals corresponding to different wave paths may be detected at each of the subsurface locations. At the left of the graph (with time flowing downward and locations horizontally) illustrating plural traces, at the right of the graph a trace is expanded for one location to illustrate the manner of picking the maximum-amplitude A at arrival time $t_A$. Step A and step B are then repeated for pre-defined source locations that may cover the entire area of a seismic survey.

Figure 9:
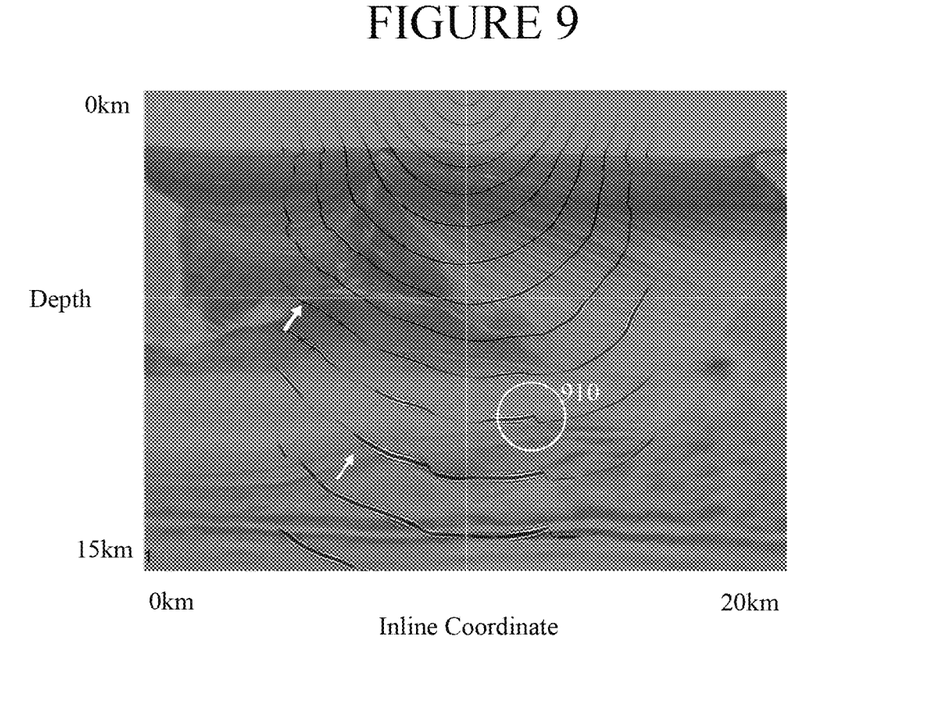
FIG. 9 illustrates the impulse response obtained using the WEK technique according to an embodiment.

Then, in step C, Kirchhoff migration is applied using the picked traveltimes and amplitudes. Traveltime and amplitude pairs can be picked from low-frequency wavefields and then applied to high-frequency migration. FIG. 9 shows the impulse response for the velocity model in FIG. 2 using the WEK method. The WEK impulse response appears more consistent with simulated wavefronts, which implies higher accuracy in traveltimes and amplitudes. Some discontinuities remain visible, for example, in the circle labeled 910. This problem occurs at the boundary between small smooth pockets on a complicated wavefront. If comparing the WEK impulse response in FIG. 9 with the ray-based impulse response in FIG. 5, it is noticeable that WEK approach has corrected the distortions in the areas near the arrows.

Figure 10:
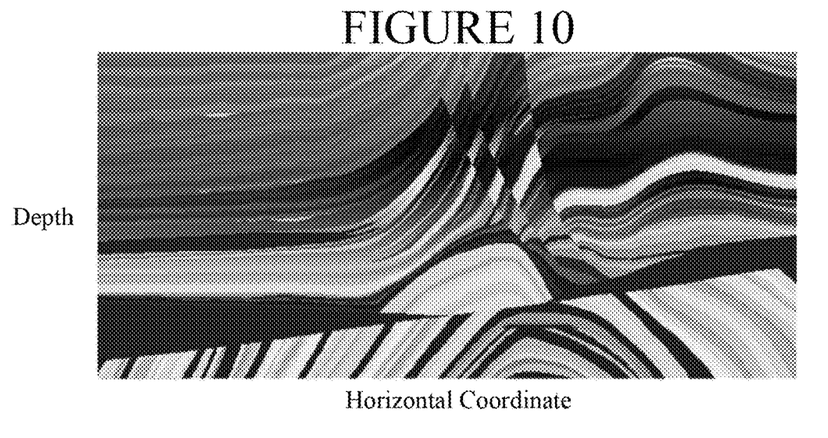
FIG. 10 illustrates the Marmousi2 velocity model used to compare results of the conventional ray-based Kirchhoff migration with those of the WEK technique.
Figure 11:
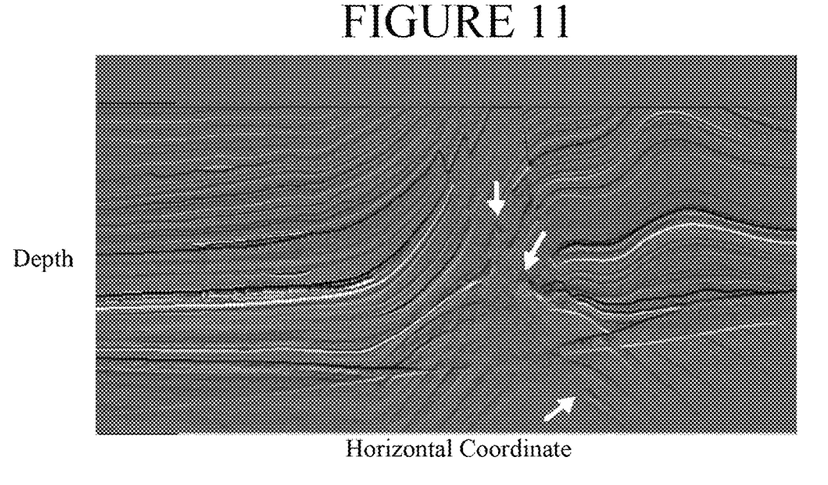
FIG. 11 illustrates the results of the conventional ray-based Kirchhoff migration using the model in FIG. 10.
Figure 12:
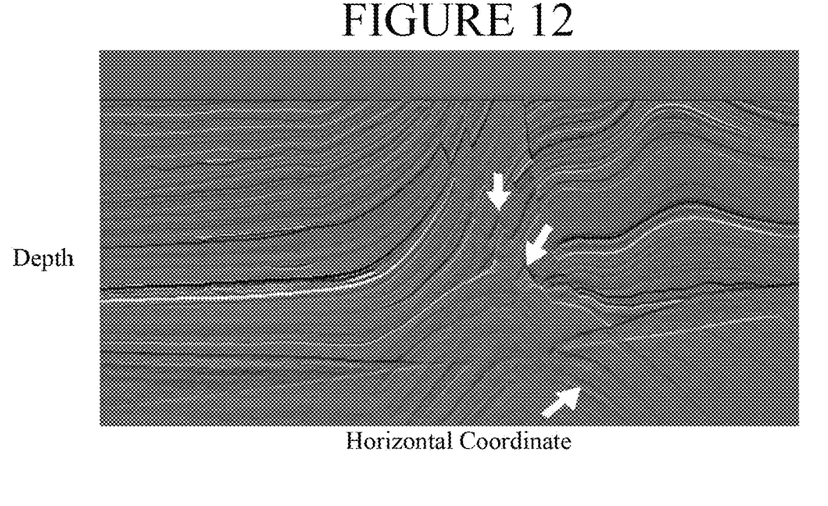
FIG. 12 illustrates the results of the WEK technique using the model in FIG. 10 according to an embodiment.

Benefits of this WEK approach over conventional ray-based Kirchhoff migration are further illustrated by applying it to a 2.5D dataset (here 2.5D means the model is invariant in y direction; the wave-propagation is still 3D). In this test, Marmousi2 velocity model (as illustrated in FIG. 10) and its corresponding Gardner density model are used to create 45 Hz seismic data through a 3D full-wavefield propagation at 250 m shot spacing and 25 m receiver spacing. Gardner density is obtained using an empirical equation $\rho p=\alpha V^\beta$ with $\alpha=0.31$ and $\beta=0.25$ when propagation velocity is expressed in m/s. The maximum offset is 8 km in the inline direction and 250 m in the crossline direction. In this case, calculating accurate traveltimes is important to correctly image the complicated structures and sharp velocity contrasts in the central area of Marmousi2 model. However, accurate traveltimes are difficult to calculate in conventional Kirchhoff where raytracing is used. In this case, conventional ray-based Kirchhoff migration results in a dim zone in the middle, as illustrated in FIG. 11 and indicated by the arrows. WEK, in contrast, computes more accurate traveltimes using full-wavefield propagation, and subsequently reveals more details in the central area, as indicated by the arrows in FIG. 12. This test has demonstrated that WEK is superior to conventional ray-based Kirchhoff migration for the complicated Marmousi2 model.

Figure 13:
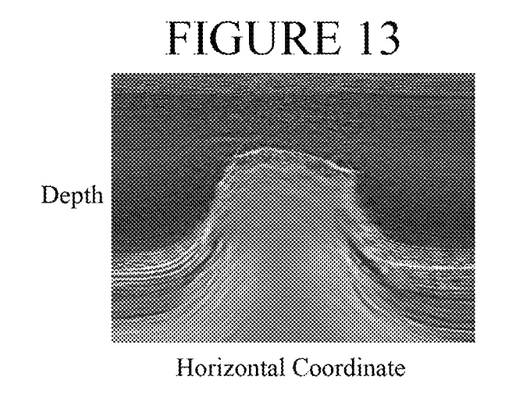
FIG. 13 illustrates the velocity model of a subsurface formation including a salt diapir.
Figure 14:
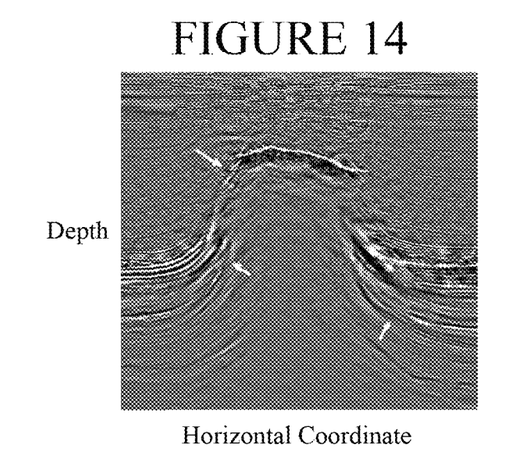
FIG. 14 illustrates the results of the conventional ray-based Kirchhoff migration using the model in FIG. 13.
Figure 15:
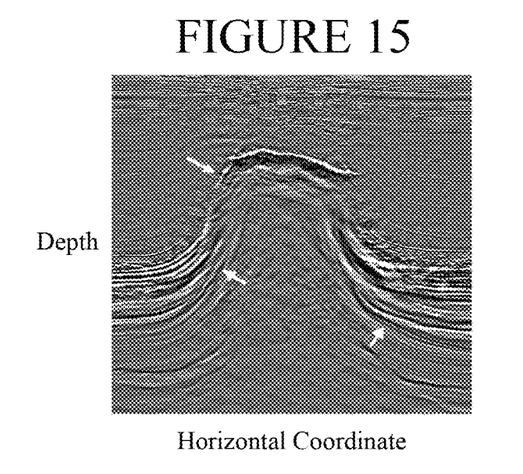
FIG. 15 illustrates the results of the WEK technique using the model in FIG. 13 according to an embodiment.

WEK's effectiveness in imaging complex geology is also demonstrated when using it to migrate seismic data acquired during real surveys. Consider a subsurface formation including a salt diapir whose velocity model in a vertical slice is illustrated in FIG. 13. This field data is acquired using a narrow-azimuth towed-streamer survey in the Central North Sea. Conventional ray-based Kirchhoff migration (whose results are illustrated in FIG. 14) fails to image clearly dipping events under the salt overhangs (see the arrows in FIG. 14). This implies that raytracing fails to give the correct traveltimes under the diapir, where the velocity varies quickly and the geology is complex. The WEK approach (whose results are illustrated in FIG. 15) shows an apparent uplift in stack coherence, especially for dipping events under the salt (see the arrows).

Figure 16:
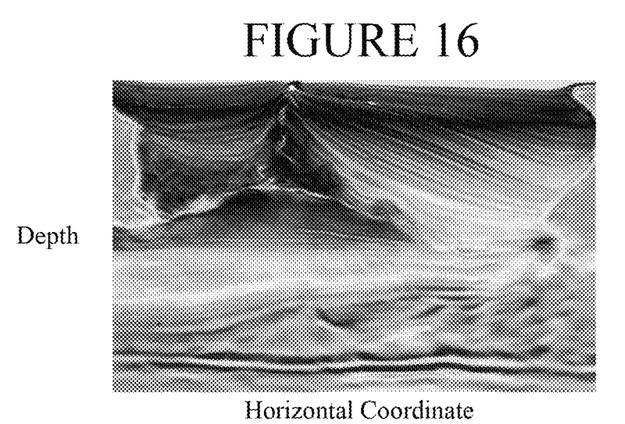
FIG. 16 illustrates another velocity model of a subsurface formation including salt.
Figure 17:
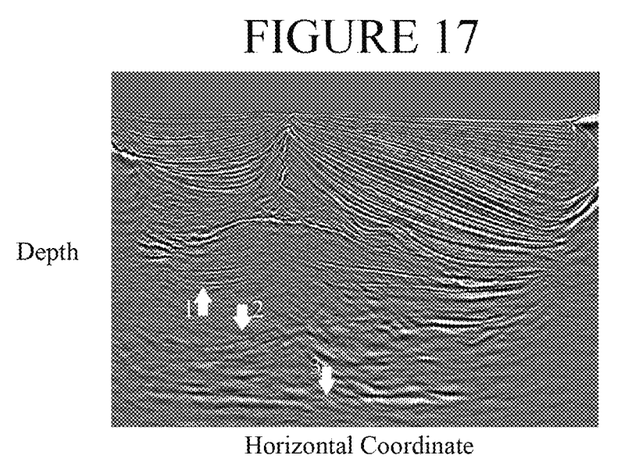
FIG. 17 illustrates the results of the conventional ray-based Kirchhoff migration using the model in FIG. 16.
Figure 18:
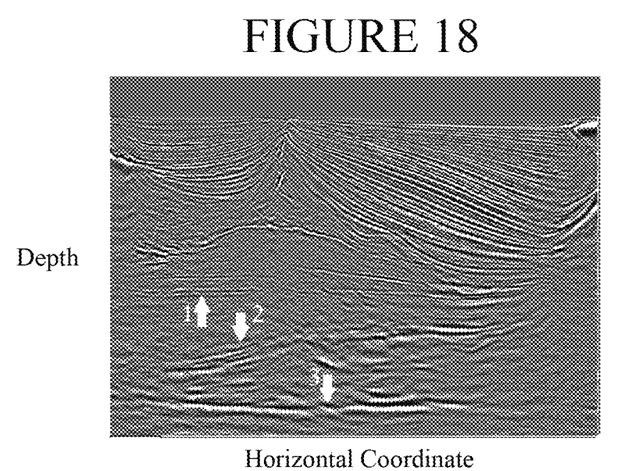
FIG. 18 illustrates the results of the WEK technique using the model in FIG. 16 according to an embodiment.

Another real data example uses a dataset acquired using two towed-streamer surveys in the U.S. Gulf of Mexico. FIG. 16 is a vertical slice of the velocity model showing complicated salt structures and slow-velocity regions. Such geological complexity and velocity anomalies pose a significant challenge for traveltime computation in ray-based Kirchhoff migration. FIG. 17 is the result obtained using conventional ray-based Kirchhoff migration, with the arrows pointing to subsalt events with poor coherence. In contrast, the WEK illustrated in FIG. 18 shows better coherence at these locations (also indicated by arrows). The improvement from WEK is also evident when comparing the ray-based Kirchhoff migration gathers with the WEK gathers. A migration gather is a gather of single-offset images at a specific lateral location, as indicated by the small vertical lines in FIGS. 17 and 18. Its x-axis represents the offset of seismic traces from which a single-offset image is generated, and y-axis is the depth.

Figure 19:
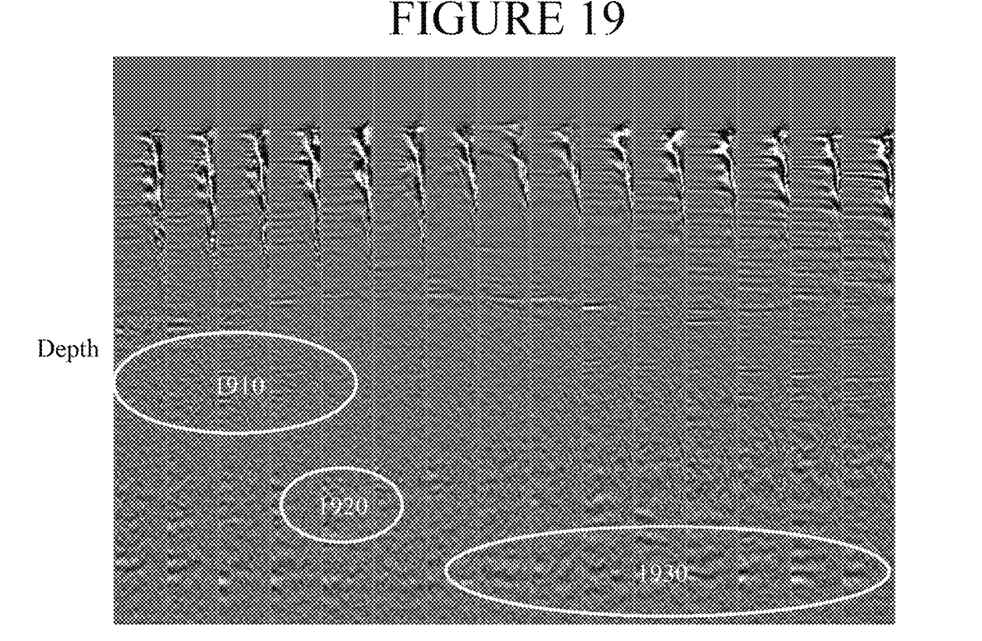
FIG. 19 illustrates gathers of the conventional ray-based Kirchhoff migration.
Figure 20:
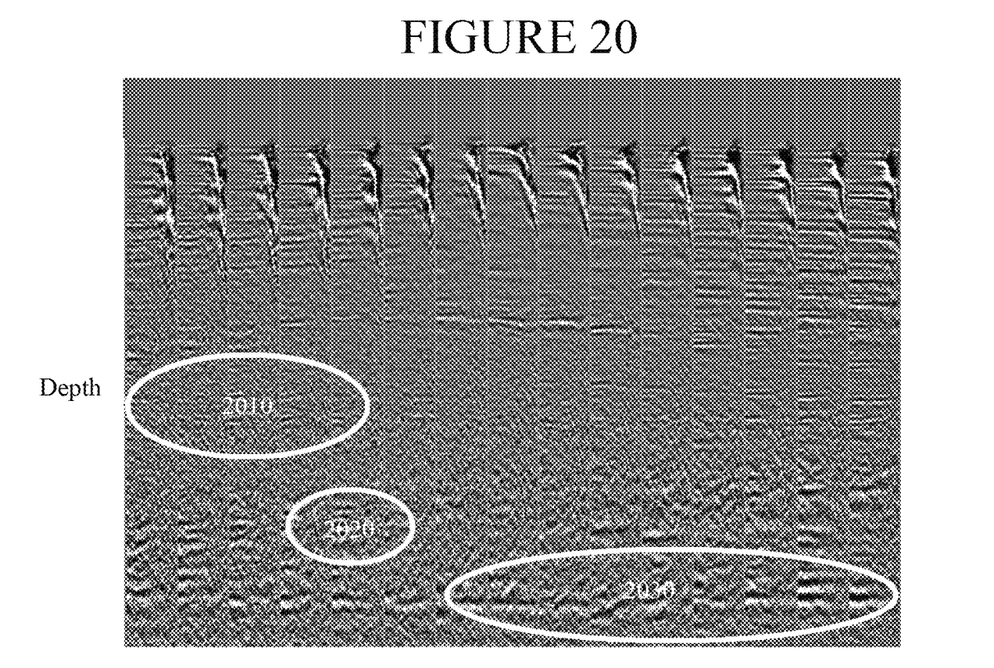
FIG. 20 illustrates gathers of the WEK technique according to an embodiment.

FIG. 19 represents ray-based Kirchhoff migration gathers and FIG. 20 the WEK gathers for the same offset range of 300-7100 m with circles in FIG. 19 highlighting regions (1910, 1920, 1930) where ray-based Kirchhoff migration is inaccurate that are improved in FIG. 20 (2010, 2020, 2030). In terms of kinematics, coherence and amplitude, the WEK image shows higher agreement with the RTM image (FIG. 4) than the ray-based Kirchhoff image does. The RTM image still looks superior because it naturally takes multi-wave paths into account, while WEK only considers one single maximum-amplitude arrival. However, RTM remains very expensive computationally, if at all possible, for RTM to create high-frequency common offset gathers.

The WEK results using both traveltimes and amplitudes derived from the wavefield computed by full-wavefield propagation for synthetic and field data examples prove that WEK can successfully account for fine-scale geo-bodies and sharp velocity contrasts, and thus improve image quality in these settings when compared with ray-based Kirchhoff migration. WEK can be a useful additional tool for validating and utilizing high-frequency FWI velocity models.

Although traveltimes and amplitudes are picked on a low-frequency wavefield (e.g., 10-20 Hz) for affordable computational cost, the picking accuracy is higher than the theoretical limit of half wavelengths. Once the traveltime is determined, the full-bandwidth time-domain seismic data can be mapped to the depth domain to produce high-resolution images.

As demonstrated in the 1996 article "Maximum energy traveltimes calculated in the seismic frequency band" by Nichols, D. E. (published in *Geophysics*, 61(1), pp. 253-263) and the 2013 article "Excitation amplitude imaging condition for prestack reverse-time migration" by Nguyen, B. D. and McMechan, G. A. (published in *Geophysics*, 78(1), pp. S37-S46), a single maximum-amplitude arrival can produce comparable images to that using full arrivals in many cases. However, when the velocity model contains many details with large contrasts (e.g., rugose top-of-salt), the wavefield becomes very complex with multiple arrivals. Multi-arrival picking may help to some extent but is very difficult to do correctly. Therefore, RTM may still be the best choice in such cases. On the other hand, when the velocity model is simple, the benefit of WEK over ray-based Kirchhoff diminishes quickly. In short, the quality benefit of WEK is more evident for some specific geologic settings, such as salt domes.

Figure 21:
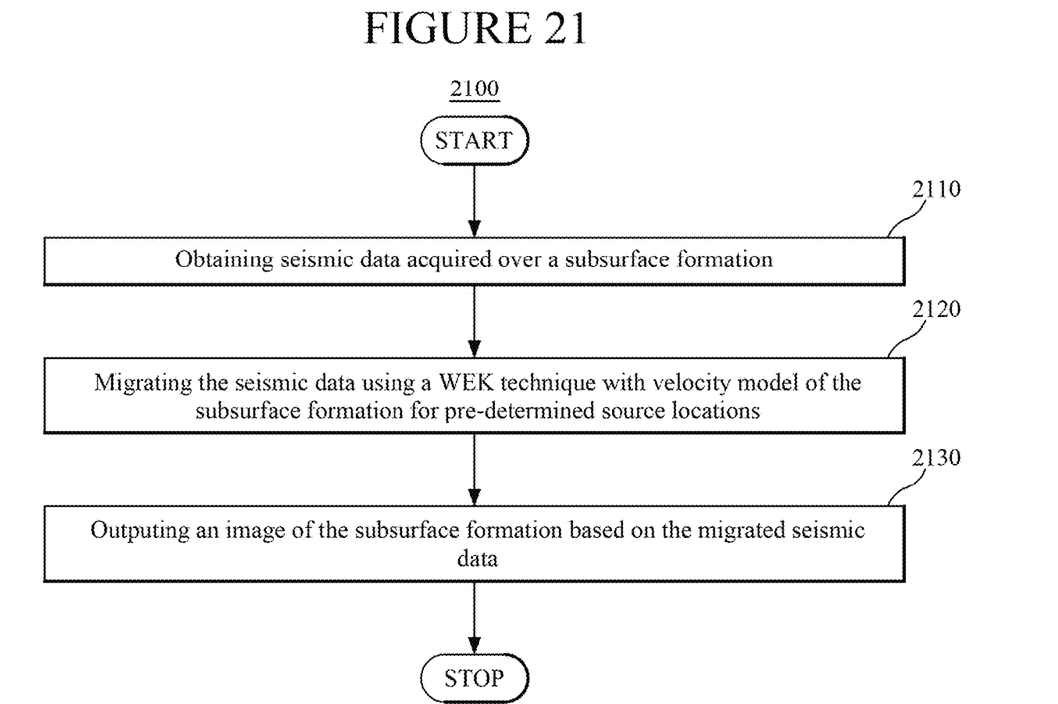
FIG. 21 is a flowchart of a method according to an embodiment.

FIG. 21 is a flowchart of WEK method 2100 for seismic exploration of a subsurface formation according to an embodiment. Method 2100 includes receiving seismic data acquired over a subsurface formation at 2110, migrating the seismic data based on a model of the subsurface formation and using a WEK technique for pre-defined source locations at 2120, and outputting an image of the subsurface formation based on the migrated seismic data at 2130. Here, the WEK technique includes: forward-propagating a wavefield from a shot location among the pre-defined source locations, calculating an arrival traveltime of a maximum amplitude, and applying Kirchhoff migration using the arrival traveltime and the maximum amplitude.

Figure 22:
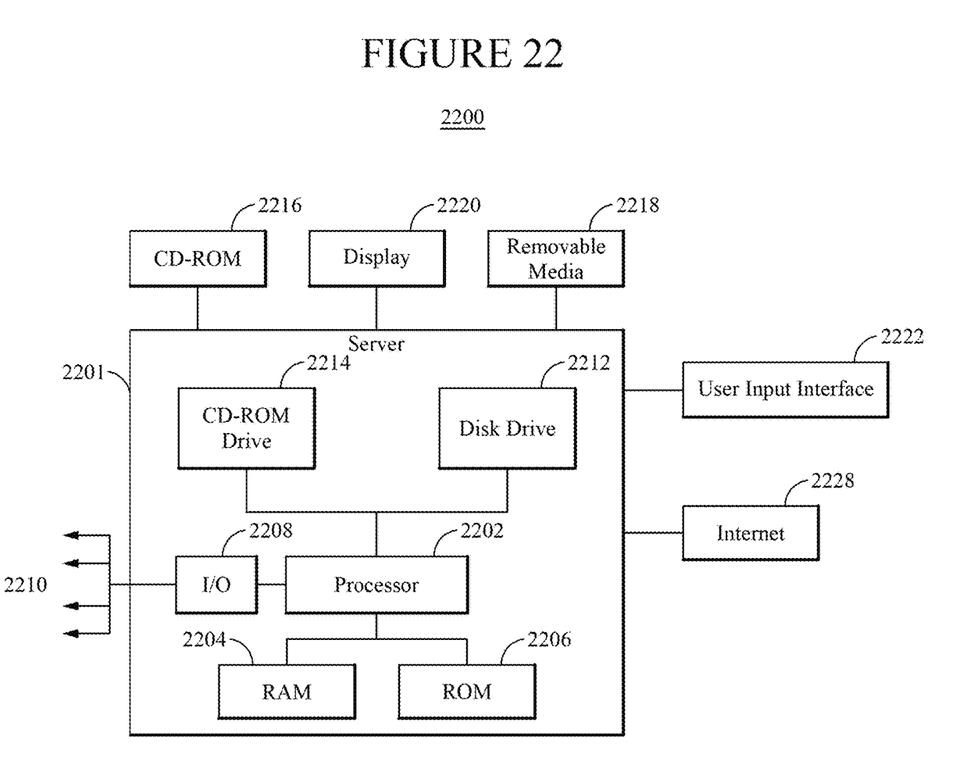
FIG. 22 is a schematic diagram of a data processing apparatus according to an embodiment.

The above-discussed methods may be implemented in a computing device 2200 as illustrated in FIG. 22. Hardware, firmware, software or a combination thereof may be used to perform the various steps and operations described herein.

Exemplary computing device 2200 suitable for performing the activities described in the exemplary embodiments may include a server 2201. Server 2201 may include a central processor (CPU or GPU) 2202 coupled to a random access memory (RAM) 2204 and to a read-only memory (ROM) 2206. ROM 2206 may also be other types of storage media to store programs, such as programmable ROM (PROM), erasable PROM (EPROM), etc. Processor 2202 may communicate with other internal and external components through input/output (I/O) circuitry 2208 and bussing 2210 to provide control signals and the like. Processor 2202 carries out a variety of functions as are known in the art, as dictated by software and/or firmware instructions.

Server 2201 may also include one or more data storage devices, including hard drives 2212, CD-ROM drives 2216 and other hardware capable of reading and/or storing information, such as DVD, etc. In one embodiment, software for carrying out the above-discussed steps may be stored and distributed on a CD-ROM or DVD 2216, a USB storage device 2218 or other form of media capable of portably storing information. These storage media may be inserted into, and read by, devices such as CD-ROM drive 2214, disk drive 2212, etc. Server 2201 may be coupled to a display 2220, which may be any type of known display or presentation screen, such as LCD, plasma display, cathode ray tube (CRT), etc. A user input interface 2222 is provided, including one or more user interface mechanisms such as a mouse, keyboard, microphone, touchpad, touch screen, voice-recognition system, etc.

Server 2201 may be coupled to other devices, such as sources, detectors, etc. The server may be part of a larger network configuration as in a global area network such as the Internet 2228, which allows ultimate connection to various computing devices.

The embodiments described in this section provide methods and apparatuses that use a WEK technique for obtaining traveltime and amplitudes used in Kirchhoff migration. It should be understood that this description is not intended to limit the invention. On the contrary, the exemplary embodiments are intended to cover alternatives, modifications and equivalents, which are included in the spirit and scope of the invention. Further, in the detailed description of the exemplary embodiments, numerous specific details are set forth in order to provide a comprehensive understanding of the invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. Other examples that occur to those skilled in the art are intended to be within the scope of the disclosed inventions.

What is claimed is:

1. A seismic exploration method comprising:
obtaining seismic data acquired in an area over a subsurface formation;
migrating the seismic data based on a model of the subsurface formation and using a wave-equation Kirchhoff, WEK, technique, for pre-defined surface locations, the WEK technique including:
forward-propagating a low-frequency wavefield from a shot location among the pre-defined locations,
deriving an arrival traveltime of a maximum amplitude of the low-frequency wavefield, and
applying Kirchhoff migration using the arrival traveltime and the maximum amplitude; and
outputting an image of the subsurface formation based on the migrated seismic data.

2. The method of claim 1, further comprising:
using the image to determine presence and/or location of subsurface resources in the subsurface formation.

3. The method of claim 1, wherein the low-frequency wavefield corresponds to a frequency range of 10-20 Hz.

4. The method of claim 3, wherein a frequency range of the seismic data extends up to 100 Hz.

5. The method of claim 1, wherein the forward-propagating of the low-frequency wavefield at the subsurface location includes:
calculating a first full-wavefield propagation based on a wave equation at low frequency with a source wavelet;
calculating a second full-wavefield propagation based on the wave equation at the low frequency with a Hilbert transformation of the source wavelet; and
applying a 1D Fourier filter in depth domain to a combination of the first full-wavefield and the second full-wavefield to extract a down-going wavefield.

6. The method of claim 1, wherein the seismic data has been acquired in a marine environment.

7. The method of claim 1, wherein the subsurface formation includes a salt body.

8. A seismic data processing apparatus comprising:
an interface configured to obtain seismic data acquired over a subsurface formation; and
a data processing unit connected to the interface and configured:
to migrate the seismic data based on a model of the subsurface formation and using a wave-equation Kirchhoff, WEK, technique for predefined source locations, the WEK technique including:
forward-propagating a low-frequency wavefield from a shot location among the pre-defined source locations,
deriving an arrival traveltime of a maximum amplitude of the low-frequency wavefield, and
applying Kirchhoff migration using the arrival traveltime and the maximum amplitude; and
to output an image of the subsurface formation based on the migrated seismic data.

9. The seismic data processing apparatus of claim 8, wherein the data processing unit is further configured to use the image to determine presence and/or location of subsurface resources in the subsurface formation.

10. The seismic data processing apparatus of claim 8, wherein the low-frequency wavefield corresponds to a frequency range of 10-20 Hz.

11. The seismic data processing apparatus of claim 8, wherein a frequency range of the seismic data extends up to 100 Hz.

12. The seismic data processing apparatus of claim 8, wherein the data processing unit is configured to perform following operations when forward- propagating the low-frequency wavefield at the subsurface location:
calculating a first full-wavefield propagation based on a wave equation at low frequency with a source wavelet;
calculating a second full-wavefield propagation based on the wave equation at the low frequency with a Hilbert transformation of the source wavelet; and
applying a 1D Fourier filter in depth domain to a combination of the first full-wavefield and the second full-wavefield to extract a down-going wavefield.

13. The seismic data processing apparatus of claim 8, wherein the seismic data has been acquired in a marine environment.

14. The seismic data processing apparatus of claim 8, wherein the subsurface formation includes a salt body.

15. The seismic data processing apparatus of claim 8, further comprising a display connected to the data processing unit and configured to display the velocity model and/or the image of the subsurface formation.

16. A non-transitory computer readable recording medium storing executable codes that, when executed by a computer, make the computer perform a seismic exploration method comprising:
obtaining seismic data acquired over a subsurface formation;
migrating the seismic data based on a model of the subsurface formation and using a wave-equation Kirchhoff, WEK, technique for pre-defined source locations, the WEK technique including:
forward-propagating a low-frequency wavefield from a shot location among the pre-defined source locations,
deriving an arrival traveltime of a maximum amplitude of the low-frequency wavefield, and
applying Kirchhoff migration using the arrival traveltime and the maximum amplitude; and
outputting an image of the subsurface formation based on the migrated seismic data.

17. The non-transitory computer readable recording medium of claim 16, the method further comprising:
using the image to determine presence and/or location of subsurface resources in the subsurface formation.

18. The non-transitory computer readable recording medium of claim 16, wherein the low-frequency wavefield corresponds to a frequency range of 10-20 Hz.

19. The non-transitory computer readable recording medium of claim 16, wherein a frequency range of the seismic data extends up to 100 Hz.

20. The non-transitory computer readable recording medium of claim 16, wherein the forward-propagating of the low-frequency wavefield at the subsurface location includes:
calculating a first full-wavefield propagation based on a wave equation at low frequency with a source wavelet;
calculating a second full-wavefield propagation based on the wave equation at the low frequency with a Hilbert transformation of the source wavelet; and
applying a 1D Fourier filter in depth domain to a combination of the first full-wavefield and the second full-wavefield to extract a down-going wavefield.

* * * * *